United States Patent [19]
Ferrand et al.

[11] 4,262,650
[45] Apr. 21, 1981

[54] EXPENSIVE ABRASIVE BASE CUTTING WHEELS WITH A METALLIC CORE NOTCHED AT THE PERIPHERY

[75] Inventors: Henri Ferrand, Chartres; Alain Echard, Luce, both of France

[73] Assignee: Applications Industrielles du Diamant S.T.I. Triffus France, Chartres, France

[21] Appl. No.: 35,410

[22] Filed: May 2, 1979

[30] Foreign Application Priority Data

Mar. 5, 1978 [FR] France .............................. 78 13241

[51] Int. Cl.³ .............................................. B28D 1/04
[52] U.S. Cl. ..................................... 125/15; 51/206 R
[58] Field of Search ......................... 51/206 R, 206 P; 125/15

[56] References Cited

U.S. PATENT DOCUMENTS

| | | | |
|---|---|---|---|
| 2,875,559 | 3/1959 | Garrison | 51/206 R |
| 2,990,828 | 7/1961 | Hoerer | 51/206 P |
| 3,036,567 | 5/1962 | Biesanz | 125/15 |
| 3,513,821 | 5/1970 | Bouvier | 125/15 |
| 3,916,579 | 11/1975 | Waller | 51/206 P |

FOREIGN PATENT DOCUMENTS 2310837 10/1976 France .

*Primary Examiner*—Harold D. Whitehead
*Attorney, Agent, or Firm*—Brisebois & Kruger

[57] ABSTRACT

A rotatable cut-off wheel includes a metal core notched at its periphery and having added abrasive elements for cutting material. The notches each have a profile which is non-parallel with the axis of rotation of the wheel, to reduce noise when the wheel is rotating.

7 Claims, 12 Drawing Figures

EXPENSIVE ABRASIVE BASE CUTTING WHEELS WITH A METALLIC CORE NOTCHED AT THE PERIPHERY

BACKGROUND OF THE INVENTION

One knows that diamond tipped cutting wheels or other wheels using expensive abrasives such as boron nitride, for example, and which are used for cutting various materials such as asbestos-cement, for example, are formed with a notched metal core, on the periphery of which one deposits electrolytically between the notches, or to which one adds by brazing tips or teeth of sintered metal, containing a diamond base or other expensive abrasive material, to form the cutting elements.

In practice, it has been established that the presence of the notches, designed to allow easier removal of the particles detached by cutting such materials by means of the wheels, causes a very disagreeable hissing or whistling, whose level must be kept below certain fixed limits set by government agencies such as those of the French Labor Inspection and/or Labor Health Board.

SUMMARY OF THE INVENTION

The object of the present invention is an improvement in the section or profile of the edges of the notches, allowing the above hissing or whistling to be eliminated or substantially reduced, the improvement consisting of giving these edges, at least on the sides touching the products to be cut by the wheel, a bevelled or rounded profile, not only at the abrasive portions used for cutting, but also the metallic core. Depending on whether the cutting wheels are to turn in one specified direction, or in either direction, bevels or curves of the above type are used only on the operative edge, or on the two opposite edges of the said notches.

In one preferred embodiment of the invention, the profile used has two bevels which are symmetrical with respect to the median plane of the wheel, parallel to the two side faces, and which bevels are joined in this median plane by a sharp edge essentially corresponding to a 90° angle between the symmetrical bevels.

The characteristics of the present invention will be better understood on reading the following description of six variations of the invention, all equally adaptable to either cutting wheels with abrasive deposits obtained by an electrolytic process, or to wheels with inserts of teeth having a metallic binder, brazed to the periphery of the metallic core, these variations being given as non-limiting examples and being described with reference to the attached drawings.

DETAILED DESCRIPTION

Figure 1:
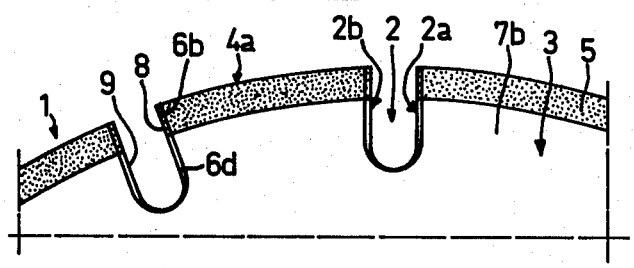
FIG. 1 is a partial elevational view of a cutting disk with sintered elements connected by brazing, and having bevelled notch edges conforming to a preferred embodiment of the invention.
Figure 3:
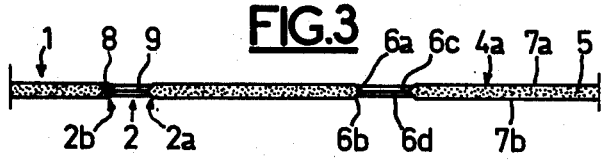
FIG. 3 is a top plan view of the portion of the wheel shown in FIG. 1.

It may be seen from FIGS. 1 and 3, that the notched cutting wheel shown there has, at its periphery, equidistant notches 2, between which are joined, to periphery of the metallic core 3 of the cutting wheel, sintered teeth or plates 4a, with a metallic binder, by brazing to the periphery 5 of the metallic core 3.

One of the characteristics of the invention is that the shape of the opposite edges 2a and 2b of the notches is duplicated, during their sintering, on the said plates 4a as best be seen on FIG. 3, where these edges 2a and 2b have an edge profile with two symmetrical bevels 6a and 6b at the two parallel faces 7a and 7b of the sintered plates 4a.

It should be noted that the provision of such bevels on the two sides of the notches 2 is for wheels able to turn in either direction, or possibly to be secured on a mandrel by either one of their two parallel faces 7a and 7b.

Figure 2:
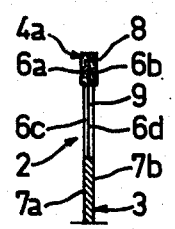
FIG. 2 is a sectional view looking along the radial plane of symmetry of one of the notches shown on FIG. 1.

As was mentioned above, bevels 6a and 6b are not made only on sintered plates 4a but also on the metallic core 3, the junction edges between the two symmetrical bevels 8 of FIGS. 2 and 3, are extended by edges of the same shape 9 forming the edges of bevels 6c and 6d of the metal core 3.

Referring to the section of FIG. 2, it may be seen particularly that plate 4a has a thickness slightly greater than that of metallic core 3 and that edges 8 and 9 separate respectively, bevels 6a and 6b on the one hand, and bevels 6c and 6d on the other hand.

It will be thus evident that the double bevel profile shown on FIGS. 2, 3, 5 and 6 may be considered a preferred embodiment of the present invention.

Further it will be seen that the profile of the edges of the notches could be different, first depending on whether the cutting wheels are designed to turn in one direction only or in either direction, and second depending on the nature of the material to be cut.

The above double bevel profile is especially applicable in cutting fibro-cement panels, which generates particularly disturbing noises.

Figure 4:
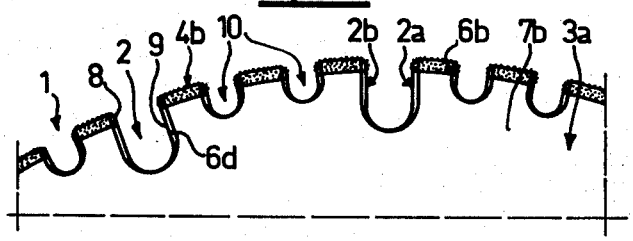
FIG. 4 is a partial elevational view of the wheel having, between the notches of its metallic core, diamond dust deposited by an electrolytic process.
Figure 5:
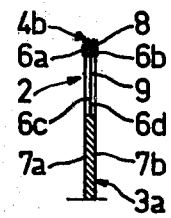
FIG. 5 is a section along a radial symmetry plane of one of the notches shown on FIG. 4.
Figure 6:
FIG. 6 is a top view of the portion of the cutting wheel shown on FIG. 4.

Referring now to FIGS. 4, 5 and 6, it can be seen that on one hand the notches made in the periphery of the cutting wheel instead of all being the same depth, are of two different types, the shallower notches being designated by reference number 10.

In any case, whether it relates to notches 2 or notches 10, their edges are made with the same profile, with the symmetrical bevels designated equally on the figures by reference numbers 6a and 6b.

Given the method of coating, by an electrolytic process, the peripheral portions of metallic core 3a, which is used in this case, to make the cutting elements having reference number 4b it is easy to understand that the elements having bevels 6a, 6b basically coincide with bevels 6c, 6d of metallic core 3a, the bevels being separated from each other by edges parallel to edges 9 and close to these latter, given the thinness of electrolytic deposits.

Figure 7:
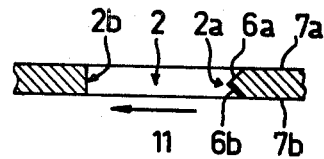
FIG. 7 is an enlarged view in section of a notch made in the metallic core of either of the two cutting wheels shown respectively on FIGS. 1 and 4, showing a double-bevel profile formed only on the operative edges of the notches of the cutting wheels, in the case where the cutting wheel is designed to turn in one direction only.
Figure 8:
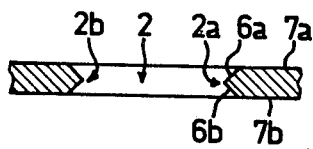
FIG. 8 is a section of a notch, comparable to that of FIG. 7, but having two symmetrical bevelled edges, designed to allow the said cutting wheel to turn equally well in either direction.
Figure 9:
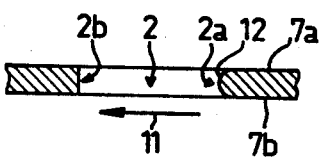
FIG. 9 is a section of a notch comparable to that of FIG. 7, but having a rounded profile replacing the double bevel visible on FIG. 7, and made only on the operative edges of the notches.
Figure 10:
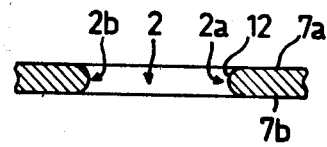
FIG. 10 is a section comparable to that of FIGS. 7 and 9, having notches with rounded edges of the type shown on FIG. 9, for cutting wheels able to turn equally well in either direction.
Figure 11:
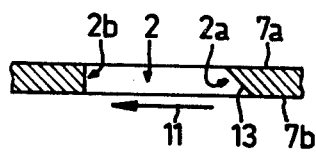
FIG. 11 is a section of a notch comparable to FIGS. 7 and 9, and also for cutting mechanisms having a fixed turning direction and on which the bevelled profile has only one flat bevel replacing the two symmetrical bevels on the operative edges shown on FIG. 7.

Referring now to FIGS. 7 to 12, it may be seen that only the right hand notch edge 2a has symmetrical bevels 6a and 6b, when the cuttng wheels are only to be used in one rotation direction corresponding to arrow 11 in FIGS. 7, 9 and 11.

On the other hand, in the embodiment in FIG. 8 the arrangement of FIGS. 3 and 6 recurs, that is, symmetrical bevels 6a and 6b on the two edges 2a and 2b of the notch. The corresponding cutting wheels may turn equally well in either direction or be mounted on an axial mandrel by either of their two faces 7a and 7b.

On FIGS. 9 and 10, the profile with symmetrical bevels 6a, 6b is replaced by a rounded profile 12 without a sharp edge, made only on edge 2a in the case of FIG. 9, and on the two edges of the notch 2a and 2b in the case of FIG. 10.

Figure 12:
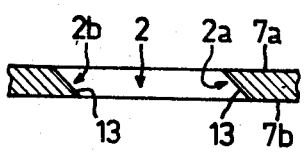
FIG. 12 is a section of a notch comparable to FIGS. 8 and 10, and also designed for cutting wheels able to turn equally well in either direction, and on which the two edges each have a bevel of the same type as that shown on FIG. 11.

Finally, in the case of FIGS. 11 and 12, the two bevels 6a and 6b are replaced by a single bevel 13, which is only made on edge 2a in the case of FIG. 11, but which is made on both edges 2a and 2b in the case of FIG. 12.

It will still be seen that bevels 13, which are not symmetrical with respect to a median plane equidistant from the two parallel faces 7a and 7b of the cutting wheels, are parallel to each other, and so are not symmetrically with respect to the radial symmetry plane of the notches 2, so that the edges touching the articles to be cut always occupy the same position relative to the articles, during cutting.

Of course, the embodiments just described may undergo various improvement or additions, and certain elements may be replaced by equivalent elements, without changing the general scope of the invention.

What is claimed is:

1. In a rotatable cut-off wheel with a thin disc metal core notched at its periphery to provide open notches and having expensive abrasive base cutting elements formed on the peripheral edges of said core between the open notches, the improvement comprising, means for substantially reducing hissing and whistling noises during high speed rotation of the wheel, said means comprising each of the side edges of the forwardly facing advancing surfaces of each of the notches and the corresponding operative edges of the cutting elements of a profile non-parallel with the axis of rotation of the wheel.

2. A cut-off wheel according to claim 1 wherein said profile comprises two bevels symmetrical with respect to a median plane parallel to the side faces of the wheel, these bevels meeting at a sharp edge in the median plane.

3. A cut-off wheel according to claim 2 wherein said symmetrical bevels are at a 90° angle with respect to each other.

4. A cut-off wheel according to claim 1 wherein said profile comprises a rounded profile free of a sharp edge.

5. A cut-off wheel according to claim 1 wherein said profile comprises a single bevel.

6. A cut-off wheel according to any one of claims 1 to 4 wherein the other edge of each of said notches is paralled to the axis of rotation of the cut-off wheel.

7. A cut-off wheel according to any one of claims 1 to 4 wherein the other edge of each of said notches has a profile corresponding to that of the forwardly facing surfaces of said notches.

* * * * *

UNITED STATES PATENT AND TRADEMARK OFFICE
CERTIFICATE OF CORRECTION

PATENT NO. : 4,262,650

DATED : April 21, 1981

INVENTOR(S) : HENRI FERRAND and ALAIN ECHARD

It is certified that error appears in the above—identified patent and that said Letters Patent is hereby corrected as shown below:

Ob the title page, Item [30] "Mar. 5, 1978" should read --- May 3, 1978 ---.

*Signed and Sealed this*

*Thirtieth* Day of *June 1981*

[SEAL]

*Attest:*

RENE D. TEGTMEYER

*Attesting Officer*      *Acting Commissioner of Patents and Trademarks*